US008433125B2

(12) United States Patent
Nireki

(10) Patent No.: US 8,433,125 B2

(45) **Date of Patent: *Apr. 30, 2013**

(54) BANK NOTE AUTHENTICATING METHOD AND BANK NOTE AUTHENTICATING DEVICE

(75) Inventor: Takao Nireki, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/562,517

(22) Filed: Jul. 31, 2012

(65) Prior Publication Data

US 2013/0004054 A1 Jan. 3, 2013

Related U.S. Application Data

(63) Continuation of application No. 12/293,144, filed as application No. PCT/JP2007/055032 on Mar. 14, 2007, now Pat. No. 8,260,027.

(30) Foreign Application Priority Data

Mar. 16, 2006 (JP) ................................ 2006-072964

(51) Int. Cl.
*G06K 9/00* (2006.01)

(52) U.S. Cl.
USPC .......................................................... 382/135

(58) Field of Classification Search .................. 382/4–9; 209/534–539; 235/379–382; 250/200–205; 356/71–75; 902/7–9
See application file for complete search history.

*Primary Examiner* — Atiba O Fitzpatrick

(74) *Attorney, Agent, or Firm* — Lexyoume IP Meister, PLLC.

(57) ABSTRACT

A method and apparatus authenticating a bill. The method irradiates infrared light having a predetermined wavelength onto a print area of a genuine bill, stores transmitted light data of light transmitted through the genuine bill as reference data, irradiates infrared light having the predetermined wavelength onto a print area of the bill to be authenticated, and compares transmitted light data of infrared light transmitted through the bill with the reference data. The method further determines in advance at least two specific regions having different invisibility under different lights of different wavelengths in a print area of the bill, applies a predetermined weighting to the transmitted light data of light in the specific regions of the bill to be authenticated and the genuine bill, and compares the weighted data with each other. Based on comparison results the bill is authenticated.

9 Claims, 9 Drawing Sheets

Fig. 4A

REFERENCE DATA STORAGE TABLE (INFRARED TRANSMISSION)

| NO | DENOMINATION | CONVEYING DIRECTION | |
|---|---|---|---|
| 1 | NEW TEN THOUSAND YEN BILL | FRONT FACE UP | RIGHTWARD |
| 2 | | | (LEFTWARD) |
| 3 | | BACK FACE UP | RIGHTWARD |
| 4 | | | (LEFTWARD) |
| · | · | · | · |
| · | · | | · |
| · | · | · | · |
| · | · | | · |
| 25 | OLD ONE THOUSAND YEN BILL | FRONT FACE UP | RIGHTWARD |
| 26 | | | (LEFTWARD) |
| 27 | | BACK FACE UP | RIGHTWARD |
| 28 | | | (LEFTWARD) |

Fig. 4B

REFERENCE DATA STORAGE TABLE (INFRARED REFLECTION)

| NO | DENOMINATION | CONVEYING DIRECTION | |
|---|---|---|---|
| 1 | NEW TEN THOUSAND YEN BILL | FRONT FACE UP | RIGHTWARD |
| 2 | | | (LEFTWARD) |
| 3 | | BACK FACE UP | RIGHTWARD |
| 4 | | | (LEFTWARD) |
| · | · | · | · |
| · | · | | · |
| · | · | · | · |
| · | · | | · |
| 25 | OLD ONE THOUSAND YEN BILL | FRONT FACE UP | RIGHTWARD |
| 26 | | | (LEFTWARD) |
| 27 | | BACK FACE UP | RIGHTWARD |
| 28 | | | (LEFTWARD) |

Fig. 4C

REFERENCE DATA STORAGE TABLE (RED TRANSMISSION)

| NO | DENOMINATION | CONVEYING DIRECTION | |
|---|---|---|---|
| 1 | NEW TEN THOUSAND YEN BILL | FRONT FACE UP | RIGHTWARD |
| 2 | | | (LEFTWARD) |
| 3 | | BACK FACE UP | RIGHTWARD |
| 4 | | | (LEFTWARD) |
| · | · | · | · |
| · | · | | · |
| · | · | · | · |
| · | · | | · |
| 25 | OLD ONE THOUSAND YEN BILL | FRONT FACE UP | RIGHTWARD |
| 26 | | | (LEFTWARD) |
| 27 | | BACK FACE UP | RIGHTWARD |
| 28 | | | (LEFTWARD) |

Fig. 4D

REFERENCE DATA STORAGE TABLE (RED REFLECTION)

| NO | DENOMINATION | CONVEYING DIRECTION | |
|---|---|---|---|
| 1 | NEW TEN THOUSAND YEN BILL | FRONT FACE UP | RIGHTWARD |
| 2 | | | (LEFTWARD) |
| 3 | | BACK FACE UP | RIGHTWARD |
| 4 | | | (LEFTWARD) |
| · | · | · | · |
| · | · | | · |
| · | · | · | · |
| · | · | | · |
| 25 | OLD ONE THOUSAND YEN BILL | FRONT FACE UP | RIGHTWARD |
| 26 | | | (LEFTWARD) |
| 27 | | BACK FACE UP | RIGHTWARD |
| 28 | | | (LEFTWARD) |

BANK NOTE AUTHENTICATING METHOD AND BANK NOTE AUTHENTICATING DEVICE

TECHNICAL FIELD

The present invention relates to a method for authenticating a bill and an apparatus for authenticating a bill.

BACKGROUND ART

Conventionally, automatic teller machines (ATMs) and money exchangers have been equipped with apparatuses for authenticating bills.

Moreover, apparatuses for authenticating bills have also been provided for automatic vending machines, gaming machines such as slot machines and pachinko gaming machines that dispense game media such as medals, coins, and gaming balls used in games according to the contents of prizes of the games, money exchangers or prepaid card vending machines equipped in game arcades where those gaming machines are installed, and further, so-called ball dispensers (so-called sandwiched devices) arranged between pachinko gaming machines.

These types of authentication apparatuses include ones that compares received light data acquired from a bill to be authenticated and received light data of a genuine bill prepared in advance to make a determination, using received light data of a transmitted light and a reflected light acquired by irradiating light onto bills.

For example, there has been a technique for authentication by alternately irradiating red light and infrared light onto a bill to provide a transmitted light per one scanning of each of the red light and infrared light as image data, sectioning this image data into a plurality of sections, and authenticating the bill based on a difference between the maximum value and minimum value per each section (see Patent Document 1, for example).

Moreover, a technique for irradiating visible light rays and infrared rays onto a bill to generate, for each reflected light thereof, two types of received light data according to the brightness/darkness of the reflected light and using a difference between these two types of received light data for a determination has also been known (see Patent Document 2, for example).

Patent Document 1: Japanese Published Unexamined Patent Application No. H10-312480

Patent Document 2: Japanese Published Unexamined Patent Application No. 2005-234702

DISCLOSURE OF THE INVENTION

Problems to be Solved by the Invention

However, imaging devices such as color copiers and scanners have been improved in performance by leaps and bounds in recent years, and thus finely forged bills (counterfeit bills) have been put into circulation one after another.

Accordingly, the conventional authentication apparatuses described above cannot always cope therewith, and thus under current situations, it is unavoidable that a new authentication apparatus must be developed every time finely forged counterfeit bills come into circulation.

Meanwhile, in game arcades and the like described above, apparatuses with relatively low authentication accuracy are often introduced. The reason is because complaints from visitors would increase if such a situation occurred that a bill is not accepted, despite actually being a genuine bill, as a result of the apparatus reacting to a slight stain or crease thereof. Therefore, there is also a tendency that game arcades are likely to be targets of counterfeit bill crimes.

An object of the present invention is to provide a method for authenticating a bill and an apparatus for authenticating a bill that can solve the above-mentioned problems.

Means for Solving Problems (1) The present invention provides a method for authenticating a bill, including: a first comparing step of irradiating light having a predetermined wavelength onto a print area of a surface of a genuine bill from a light emitting unit, storing in advance transmitted light data of light transmitted through the genuine bill as reference data, irradiating light having the predetermined wavelength onto a print area of a surface of a bill to be authenticated from a light emitting unit, and comparing transmitted light data of light transmitted through the bill with the reference data; and a second comparing step of determining in advance a specific region in a print area of a surface of a bill, applying a predetermined weighting to the transmitted light data of light in the specific regions of the bill to be authenticated and the genuine bill, and comparing the weighted data with each other, wherein based on comparison results in the first and second comparing steps, the bill is authenticated.

(2) The present invention is the method for authenticating a bill according to the above (1), wherein when comparing a bill to be authenticated and a genuine bill, besides the transmitted light data of light, reflected light data of light in the specific regions are further used.

(3) The present invention is the method for authenticating a bill according to the above (1) or (2), wherein the light emitting unit is capable of irradiating light of different wavelengths, and when comparing a bill to be authenticated and a genuine bill, transmitted light data and/or reflected light data of light having a different wavelength in the specific regions are further used.

(4) The present invention is the method for authenticating a bill according to any one of the above (1) to (3), wherein the specific region includes a region that is different in data to be acquired when light of different wavelengths is irradiated.

(5) The present invention is the method for authenticating a bill according to any one of the above (2) to (4), wherein, as the predetermined weighting, transmitted light data and/or reflected light data in the specific region is multiplied by a weighting ratio.

(6) The present invention is the method for authenticating a bill according to any one of the above (2) to (4), wherein, as the predetermined weighting, the amount of transmitted light data and/or reflected light data in the specific region is increased to be larger than that of data in other regions.

(7) The present invention provides an apparatus for authenticating a bill including: a bill conveying mechanism that conveys a bill to be authenticated; an optical sensor that irradiates light onto a bill conveyed by the bill conveying mechanism and receives a transmitted light irradiated and transmitted through the bill; a weighting unit that applies weighting to received light data acquired by being received by the optical sensor in a specific region determined in a print area of a surface of the bill; and an authenticating section that determines authenticity of a bill, wherein the authenticating section includes: a storing unit that stores reference received light data in an entire print area of a surface of a genuine bill including the specific region; a first comparing unit that compares the reference received light data stored in the storing unit with received light data in an entire print area of a surface of a bill to be authenticated acquired by the optical sensor; and a second comparing unit that compares weighted received light data in the respective specific regions of the bill to be authenticated and the genuine bill with each other.

Effect of the Invention

According to the present invention, a method for authenticating a bill and an apparatus for authenticating a bill further improved in authentication accuracy can be provided, which allows greatly contributing to prevention of counterfeit bill crimes.

BRIEF DESCRIPTION OF THE DRAWINGS

[FIG. 4] Explanatory views of reference data tables stored in a reference data storage section.

DESCRIPTION OF SYMBOLS

Figure 1:
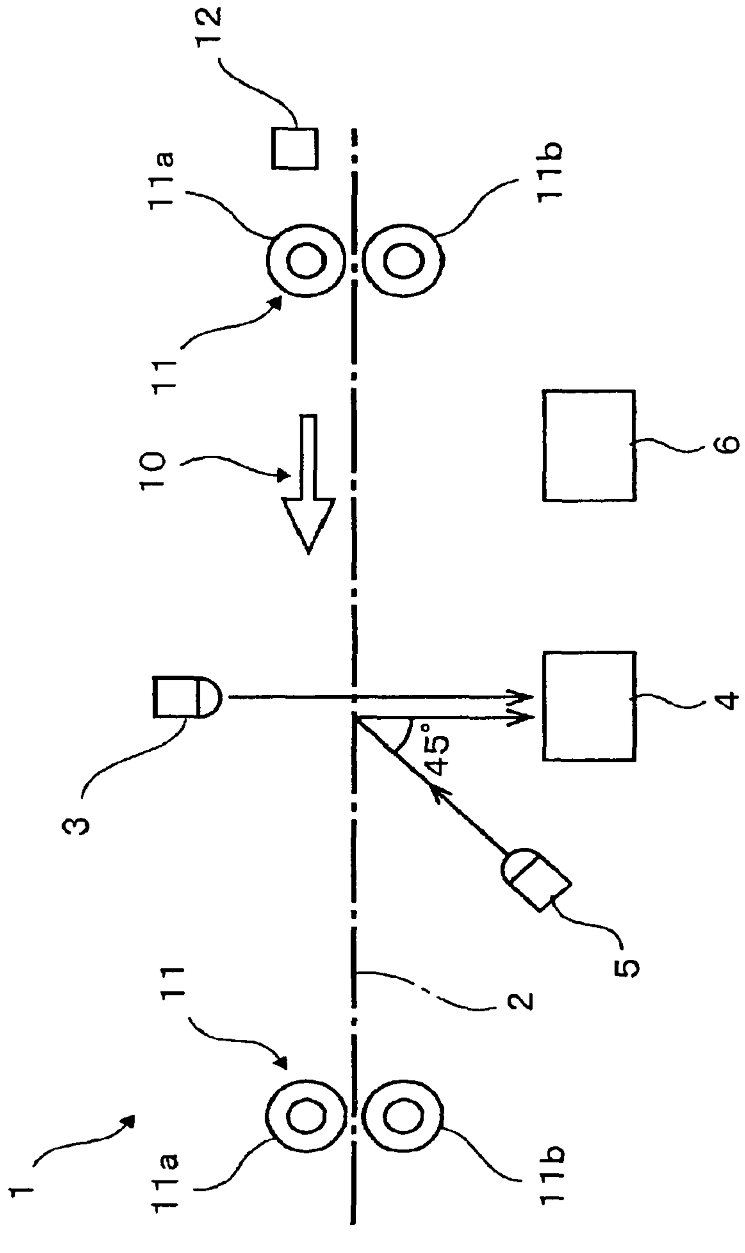
[FIG. 1] A schematic explanatory view of a bill validator serving as an apparatus for authenticating a bill according to the present embodiment.

1 Bill validator (authentication apparatus)
2 Bill
3 First light emitting section (light emitting unit)
4 Light receiving section
5 Second light emitting section (light emitting unit)
6 Control section
60 CPU
61 ROM
62 RAM
63 Reference data storage section

BEST MODES FOR CARRYING OUT THE INVENTION

A method for authenticating a bill according to the present embodiment includes: a first comparing step of irradiating light having a predetermined wavelength onto a print area of a surface of a genuine bill from a light emitting unit, storing in advance transmitted light data of light transmitted through the genuine bill as reference data, irradiating light having the predetermined wavelength onto a print area of a surface of a bill to be authenticated from a light emitting unit, and comparing transmitted light data of light transmitted through the bill with the reference data; and a second comparing step of determining in advance a specific region in a print area of a surface of a bill, applying a predetermined weighting to the transmitted light data of light in the specific regions of the bill to be authenticated and the genuine bill, and comparing the weighted data with each other, wherein based on comparison results in the first and second comparing steps, the bill is authenticated.

More specifically, by determining, in the print area of the surface of a bill, such a region that is different in image to be acquired between under visible light and under infrared light, in advance, as a specific region, and applying weighting to transmitted light data of infrared light in this specific region more than transmitted light data acquired from other regions, and comparing these weighted data with each other, accuracy of authentication is made higher than that by comparing transmitted light data in the entire print area of the surface of a bill with each other.

As above, a genuine bill includes such a region that is different in image to be acquired between under visible light and under infrared light.

The inventor has focused on the fact that, for example, in a watermark region provided in a bill, an image in the region looks greatly different between when the image is observed under light of different wavelengths (for example, when an image in the region is observed under red light and when this is observed under infrared light).

Using such a region as a specific region, transmitted light data by infrared light in the specific region is acquired, weighting is applied to each of the acquired transmitted light data and transmitted light data in the same specific region of a genuine bill acquired in advance, and weighted data are compared with each other. Such a method allows making authentication with a higher accuracy as to whether the bill to be authenticated is a genuine bill or a counterfeit bill.

At this time, by determining a specific region according to the denomination and setting a predetermined weighting to transmitted light data in this specific region, it also becomes possible to further improve authentication accuracy.

In either case of the first comparing step or the second comparing step according to the present embodiment, when performing authentication by comparing reference data and acquired data, transmitted light data can be indicated by a grayscale value, that is, a density value (luminance value), and thus a determination can be made by a correlation coefficient computed by substituting the value for an appropriate correlation equation.

Moreover, when performing authentication, it is also possible to make a determination by producing, for example, analog waveforms from transmitted light data and comparing the shapes of the waveforms with each other.

Meanwhile, when comparing a bill to be authenticated and a genuine bill, besides the transmitted light data of light, reflected light data of light in the specific regions may further be used. For example, besides the transmitted light data of infrared light mentioned above, reflected light data of infrared light in the respective specific regions can further be used.

As such, by performing a comparison of reflected light data besides the transmitted light data, authentication accuracy can be further enhanced. Moreover, it can also be considered that, in the print area of the surface of a bill, a region where reflected light data can be more easily compared than transmitted light data exists. In such a case, a determination with weighting applied to only the reflected light data may be performed.

Moreover, the light emitting unit is capable of irradiating light of different wavelengths, and when comparing a bill to be authenticated and a genuine bill, transmitted light data and/or reflected light data of light having a different wavelength in the specific regions may further be used.

For example, a light emitting unit can be constructed so as to be capable of irradiating infrared light and red light, and when comparing a bill to be authenticated and a genuine bill, besides transmitted light data and/or reflected light data of infrared light in the specific regions, transmitted light data and/or reflected light data of red light can further be used.

Since infrared light and red light are different in wavelength, when transmitted light data and reflected light data by a plurality of lights different in wavelength are used for authentication of a bill, a feature that transmitted lights that are transmitted through specific regions of a genuine bill and a counterfeit bill and reflected lights that are reflected from the specific regions are different in transmittance and reflectivity, respectively, can further be taken into consideration. By adopting such a method, authentication accuracy can be further enhanced.

In this case as well, the transmitted light data and reflected light data are applied with weighting. Also, the degree of weighting can also be differentiated for each of received light data acquired from a transmitted light and a reflected light having different wavelengths from each other, and it also becomes possible to further improve authentication accuracy.

Moreover, it is provided that the specific region includes a region that is different in data to be acquired when light of different wavelengths is irradiated. For example, not only can the "watermark region" mentioned above and the like be considered, but a region printed with a latent image and a region printed by a pearl ink are also included. A bill also includes another region different in data to be acquired when lights of different wavelengths are irradiated, and it is more preferable to set at least two or more regions as specific regions in enhancing authentication accuracy.

The latent image is one type of anti-counterfeit technology, for example, such an image that is invisible when being observed straight but appears when being obliquely observed, as has been applied to a current Japanese bill (Bank of Japan note). In the Bank of Japan note, within a region where nothing is visible in a state observed straight, characters such as "NIPPON" emerge when the bill is tilted, and these are visible.

Then, the inventor has found that the hidden characters "NIPPON" can be recognized when the region printed with such a latent image is imaged by transmitting therethrough infrared light having a wavelength in a predetermined range of the near-infrared region. Also, in the present embodiment, an optical sensor that irradiates light having a wavelength of nearly 950 nm, which is commonly used and inexpensive in cost, has been used, and as the wavelength being in a predetermined range, a wavelength of nearly 950 nm has been used, however, the wavelength being in a predetermined range is not limited to such a wavelength. In other words, a wavelength out of a wide range can be appropriately used as long as this is included in the near-infrared region.

Accordingly, it is considered that, when authenticating a bill to be authenticated with reference to a genuine bill in terms of the region printed with a latent image, which is a region difficult to be forged, a difference therebetween is made more obvious by comparing these with each other using, respectively, transmitted light data of infrared light having a wavelength of nearly 950 nm being in the above-mentioned range, and this becomes considerably effective for authentication. Particularly, it can be expected that a difference between the genuine bill and counterfeit bill becomes clearer by applying weighting to the transmitted light data and comparing the weighted transmitted light data with each other.

Moreover, in the Bank of Japan note, the pearl ink has been adopted for an anti-counterfeit purpose, so that a slightly pinkish pearl luster emerges in a print part when the bill is tilted. It is known that such print by pearl ink is also difficult to be forged. Therefore, by comparing a bill to be authenticated with a genuine bill in terms of the region printed by a pearl ink using weighted transmitted light data and reflected light data, authentication can be easily and accurately performed.

In greater detail, pearl ink is an ink containing a pearl pigment prepared by coating natural mica with a metal oxide such as titanium oxide, iron oxide, and the like, where multiple reflected light at a boundary between a layer of titanium oxide having a high refractive index and mica and a medium in the periphery thereof having a low refractive index interferes to create a unique pearl luster, and thus it is not easy to manufacture a pearl ink from which completely the same reflected light can be obtained. Accordingly, by applying weighting to data in a region printed by such pearl ink, authentication between a genuine bill and a counterfeit bill can be accurately performed.

In the description made so far, it has been provided that a predetermined weighting is applied to transmitted light data and reflected light data acquired from the specific region more than data acquired from other regions in the print area of the surface of a bill.

As such predetermined weighting, it can be considered to, for example, multiply transmitted light data and/or reflected light data in the specific region by a weighting ratio.

More specifically, in the above-mentioned correlation equation to determine authenticity of a bill using transmitted light data of infrared light, a density value from acquired data is multiplied by a weighting ratio or the like to increase the breadth of comparison of a value to be computed, so as to further improve authentication accuracy.

Since the value of the weighting ratio can be variously set, by simply changing only the value of the weighting ratio after data acquisition, it also becomes possible to cope with various types of authentication.

Moreover, as described in the foregoing, in the case of a comparison by an analog waveform indicating density (luminance) produced from transmitted light data and/or reflected light data in the specific region, it can be considered to expand the waveform at a predetermined magnification. In this case, since expanded waveforms are compared with each other, authentication accuracy is further enhanced.

Furthermore, as the method for applying a predetermined weighting to transmitted light data and reflected light data acquired from the specific region more than data acquired from other regions that has been mentioned, it can also be considered to increase the amount of transmitted light data and/or reflected light data in the specific region to be larger than that of data in other regions (or to increase the coordinate density in the specific range to be higher than that in other regions).

Relatively speaking, the data amount in a region other than the specific region or the coordinate density can also be reduced. In this case, it also becomes possible to improve data processing efficiency. Moreover, it is also possible to change the data density for each specific region.

Concretely, as the light emitting unit of infrared light and red light, LED arrays or the like of a large number of LEDs provided in lines are favorably used. And, when such LED arrays are used for irradiation to a region other than the specific region, the LEDs can be driven in a thinned-out manner, while all LEDs can be driven for the specific region. By such a method, an energy-saving effect can be expected.

Alternatively, it is possible to specify the specific region by coordinates on the surface area of a bill. Therefore, it is also possible to control the conveying speed of the bill by a bill conveying mechanism to be described later provided in an authentication apparatus to become lower in the specific region than that in other regions, so as to increase the amount of transmitted light data and reflected light data.

As an authentication apparatus that has realized the method for authenticating a bill described above, the following can be considered.

An authentication apparatus including: a bill conveying mechanism that conveys a bill to be authenticated; an optical sensor that irradiates light onto a bill conveyed by the bill conveying mechanism and receives a transmitted light irradiated and transmitted through the bill and a reflected light reflected from the bill; a weighting unit that applies weighting to received light data detected by the optical sensor in a specific region determined in a print area of a surface of the bill; and an authenticating section that determines authenticity of a bill, wherein the authenticating section includes: a storing unit that stores reference received light data in an entire print area of a surface of a genuine bill including the specific region; a first comparing unit that compares the reference received light data stored in the storing unit with received light data in an entire print area of a surface of a bill to be authenticated acquired by the optical sensor; and a second comparing unit that compares weighted received light data in the respective specific regions of the bill to be authenticated and the genuine bill with each other.

For the bill conveying mechanism, rollers, belts, or the like can be used. Moreover, the authenticating section can be formed of a microcomputer including a CPU and a ROM, a RAM, etc. as storing unit.

Then, by providing the bill conveying mechanism in a bill conveying unit and providing the authenticating section in an authentication unit, an apparatus for authenticating a bill for which these are separately provided may be constructed. Alternatively, an apparatus for authenticating a bill for which both the bill conveying mechanism and authenticating section are incorporated in an identical unit may be provided.

In the ROM, an authentication program to make the microcomputer execute the authentication method described above, received light data in the entire print area of the surface of a bill including received light data (for example, transmitted light data and reflected light data by infrared light and transmitted light data and reflected light data by red light) in the specific region of a genuine bill to be reference data, and a program to apply weighting to received light data in the specific region can be stored in advance.

Then, received light data of a bill to be authenticated is acquired by the optical sensor and stored in the RAM, and by comparing the received light data with the reference data by the first comparing unit and the second comparing unit, authentication is performed.

Also, the first comparing unit and the second comparing unit are not provided as different hardware configurations, but the authenticating section can be made to assume functions of these in common.

Moreover, as the light emitting unit, the LED arrays as in the foregoing can be used. In the present embodiment, a first light emitting array to emit infrared light and a second light emitting array to emit red light are disposed. Also, as the light emitting unit, one formed of a rectangular rod-shaped body made of a synthetic resin attached with an LED element at one end thereof and provided with a light guide body inside thereof can also be favorably used. The light emitting unit constructed as such can uniformly irradiate light from the LED element.

By using the apparatus for authenticating a bill described in the above, even if there is similarity as a result of a comparison between received light data in the entire print surfaces of bills, by comparing weighted data in the specific regions with each other, authentication can be performed with accuracy. Also, in this case, the weighting can also be changed for each denomination.

Moreover, by using, as received light data, reflected light data besides transmitted light data, and further by using infrared light alone as light to be irradiated onto a bill, or adding red light, it is provided so as to determine the bill to be a counterfeit bill if, in a comparison between the respective received light data, any one deviates from a level to allow a determination to be a genuine bill, whereby authentication accuracy can be remarkably improved.

Moreover, for storing reference data of a genuine bill in the storing unit, a storing unit in which the reference data has been stored in advance may be incorporated in an authentication apparatus, however, for example, after an authentication apparatus is assembled, the authentication apparatus can also be made to acquire received light data while conveying a genuine bill through the bill conveying mechanism and store the received light data as reference data. Accordingly, it becomes possible to store corresponding optimized reference data in each authentication apparatus. Moreover, by updating the reference data by using a unit for moving averages and the like, even without performing a white correction and the like as needed for coping with time degradation of the hardware, it is possible to optimize the reference data in a manner adapted to power variation.

Meanwhile, in the method and apparatus for authenticating a bill described above, a description has been given in a manner divided into a first comparing step of comparing transmitted light data of infrared light transmitted through the entire print area of the surface of a bill to be authenticated with the reference data and a second comparing step of applying a predetermined weighting to the transmitted light data of infrared light in a specific region specified in advance in a print area of the surface of a bill and comparing the weighted data between the bill to be authenticated and the genuine bill, the comparisons can also be simultaneously performed without being divided.

For example, an authentication program incorporated in advance with a correlation equation for comparison including a relational expression for applying weighting is used. At this time, reference data prepared by applying in advance weighting to data on a specific region in transmitted light data of infrared light transmitted through the entire print area of the surface of a genuine bill and reflected light data of red light reflected from the same is stored in a storage device.

On the other hand, in an authentication apparatus integrated with the authentication program, out of transmitted light data of infrared light transmitted through the entire print area of the surface of a bill to be authenticated or reflected light data of red light reflected from the same, data on the specific region part is applied with weighting in parallel, and the data is compared with the reference data. At this time, as the data, for example, a waveform that represents a luminance value (density value) can also be produced to make a comparison using the waveform.

More specifically, provided is a method for authenticating a bill that determines authenticity by irradiating, onto a print area of a genuine bill in which a specific region has been determined in advance, infrared light having a specific wavelength from a light emitting unit, storing, in advance, as reference data, data prepared by applying a predetermined weighting to, of transmitted light data of infrared light transmitted through the genuine bill, transmitted light data transmitted through the specific region, as well as irradiating, onto a print area of a surface of a bill to be authenticated, infrared light having the predetermined wavelength from a light emitting unit, applying the same weighting as that of the genuine bill to, of transmitted light data of infrared light transmitted through the bill, transmitted light data transmitted through the specific region, and comparing entire transmitted light data including the weighted transmitted light data in the specific region with the reference data.

Even such a method allows authentication at an extremely high accuracy. Moreover, as an authentication apparatus that realizes this method, the following can be considered.

An apparatus for authenticating a bill including: a bill conveying mechanism that conveys a bill to be authenticated; an optical sensor that irradiates light onto a bill conveyed by the bill conveying mechanism and receives a transmitted light irradiated and transmitted through the bill and a reflected light reflected from the bill; a weighting unit that applies weighting to received light data detected by the optical sensor in a specific region determined in a print area of a surface of the bill; and an authenticating section that executes the authentication method described above, wherein the authenticating section includes: a storing unit that stores reference data in an entire print area of a surface of a bill including the specific region; and comparing unit that is capable of comparing the reference data in the entire print area stored in the storing unit with received light data in an entire print area of a surface of a bill to be authenticated acquired by the optical sensor and comparing weighted received light data in the respective specific regions of the bill to be authenticated and the genuine bill with each other.

Figure 2:
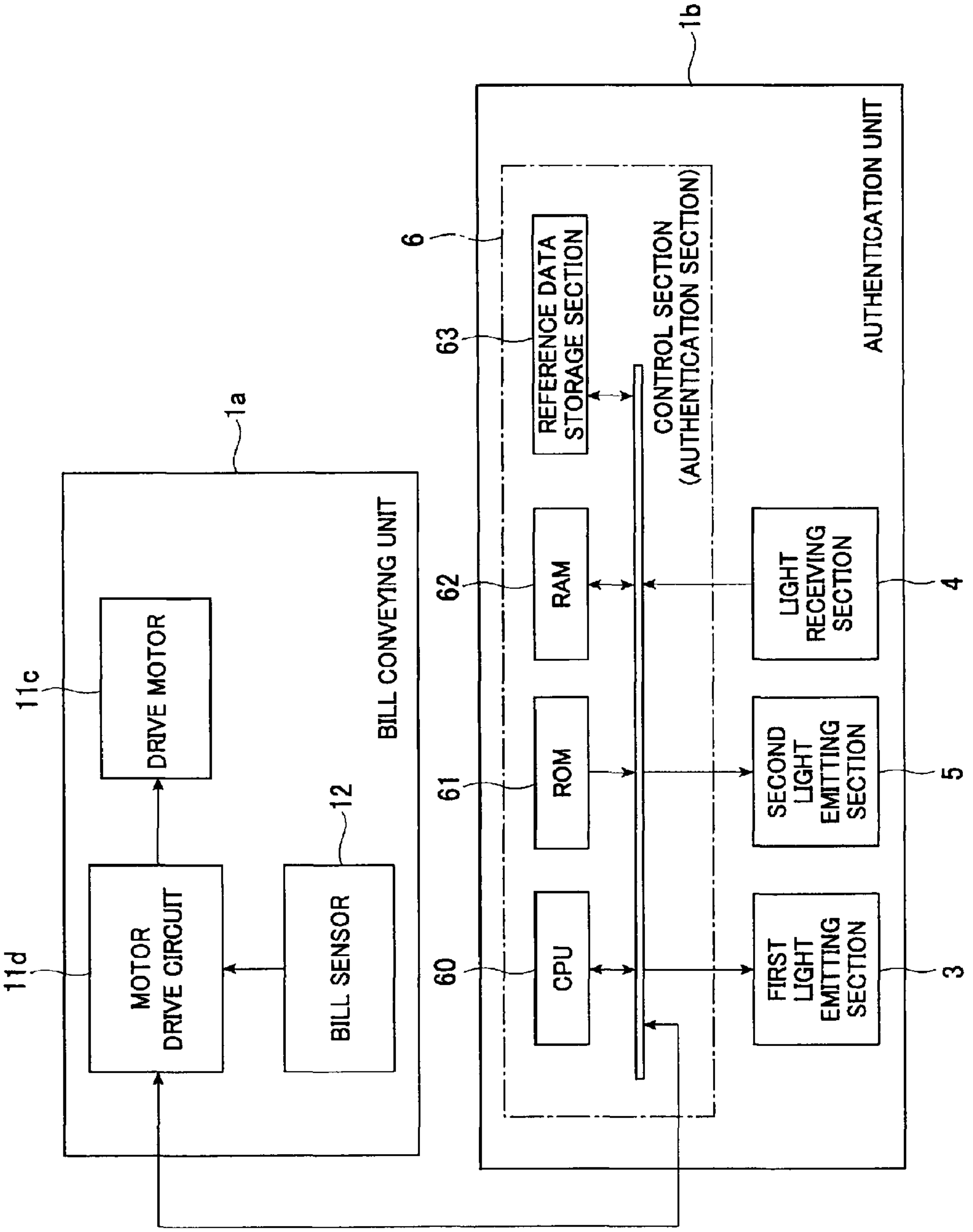
[FIG. 2] A block diagram showing a control system of the same bill validator.

Hereinafter, embodiments of the present invention will be described in greater detail referring to the drawings. FIG. 1 is a schematic explanatory view of a bill validator serving as an apparatus for authenticating a bill according to the present invention, FIG. 2 is a block diagram showing a control system of the same bill validator, FIG. 3 are schematic explanatory views showing the front and back faces of a bill, and FIG. 4 are explanatory views of reference data tables stored in a reference data storage section.

Although a bill validator 1 according to the present embodiment to be described in the following is described as one provided for a money exchanger or a prepaid card vending machine in a game arcade installed with slot machines, pachinko gaming machines, and the like, this can also be applied to an ATM, a money exchanger, and the like installed in a bank or the like.

For the bill validator 1, as shown in FIG. 1, provided in the front and rear of a bill conveying path 10 are conveying rollers 11, 11 each composed of a pair of upper and lower rollers 11*a* and 11*b* with a predetermined interval therebetween, and at a start end side of the bill conveying path 10, that is, in the vicinity of a bill insertion slot (not shown), a bill sensor 12 is provided.

Moreover, in the middle of the bill conveying path 10, a first light emitting section 3 made to be capable of irradiating infrared light and red light at an upper side of a bill 2 to be conveyed is disposed, and at a lower side across the bill 2, a light receiving section 4 having a light receiving sensor is disposed in a manner opposed to the first light emitting section 3. Moreover, disposed in a manner adjacent to the light receiving section 4 is a second light emitting section 5, which is also made to be capable of irradiating infrared light and red light.

The conveying rollers 11, the bill sensor 12, the first light emitting section 3, the second light emitting section 5, and the light receiving section 4 are controlled by a control section 6 connected by unillustrated wiring.

In the present embodiment, as shown in FIG. 2, disposed in a casing of the money exchanger or prepaid card vending machine is, as a bill conveying unit 1*a*, the bill conveying path 10, a bill conveying mechanism composed of the conveying rollers 11 and a driving system of the conveying rollers 11, and the bill sensor 12 and, as an authentication unit 1*b*, the first light emitting section 3, the second light emitting section 5, and the light receiving section 4 and the control section 6. Also, the control section 6 functions as an authenticating section for the bill 2 as will be described later, and the placement point thereof is not always limited to the inside of the authentication unit 1*b*. The control unit 6 may be provided outside the authentication unit 1*b*.

As shown in FIG. 2, the bill sensor 12 and a drive motor 11*c* for driving the conveying rollers 11 disposed in the bill conveying unit 1*a* are electrically connected with the control section 6. Also, the drive motor 11*c* is connected with the control section 6 via a motor drive circuit 11*d*. The conveying rollers 11 that are components of the bill conveying mechanism may be replaced with conveying belts and the like.

The light receiving section 4 is formed in a thin-walled plate shape extending in a crossing direction with respect to the bill conveying path 10 and formed in a band shape having a width to an extent that does not influence the sensitivity of an unillustrated light receiving sensor provided in the light receiving section 4. In the present embodiment, the light receiving section 4 is arranged in almost the center of the bill conveying path 10. Also, the light receiving sensor is provided as a so-called line sensor, for which a plurality of CCDs (Charge Coupled Devices) are provided in a line form in the center of a thickness direction of the light receiving section 4 and a self-focus lens array is also arranged in a line format a position above the CCDs. Then, it becomes possible to receive a reflected light or a transmitted light of infrared light and red light from the first light emitting section 3 and the second light emitting section 5 irradiated onto the bill 2 to be authenticated and generate, as received light data, grayscale data according to the luminance thereof and a two-dimensional image from the grayscale data.

Moreover, although not shown, the first light emitting section 3 to serve as a light source for transmission arranged in opposition to the light receiving section 4 is formed in a rectangular rod-shaped body made of a synthetic resin made to be capable of wholly and uniformly irradiating light from an LED element attached to one end thereof through a light guide body provided inside. And, the first light emitting section 3 is disposed in a line form parallel to the light receiving section 4 (light receiving sensor).

Moreover, the second light receiving section 5 to serve as a light source for reflection is also constructed as in the first light emitting section 3, and is arranged in a line form. And, the second light receiving section 5 is made to be capable of irradiating light onto the bill 2 at an elevation angle of 45 degrees, and is arranged at a lower course side of the light receiving section 4 in a bill conveying direction at an appropriate interval therefrom so that a reflected light from the bill 2 is received by the light receiving section 4 (light receiving sensor). Also, the arrangement and the like of the first and second light emitting sections 3 and 5 and the light receiving section 4 is not limited to that of the present embodiment, and an appropriate layout can be made.

Moreover, in the present embodiment, as shown in FIG. 1, light irradiated from the second light emitting section 5 is made incident into the light receiving section 4 (light receiving sensor) at 45 degrees. However, the incident angle is not limited to 45 degrees, and can be appropriately set as long as it is in a range that allows reliably receiving a reflected light. Accordingly, with regard to the arrangement of the second light emitting section 5 as well, a design change can be appropriately made according to the structure of the bill validator 1. Although this is omitted in FIG. 1, in the present embodiment, the second light emitting section 5 is installed also at an opposite side across the light receiving section 4, so that lights are irradiated from both sides at an incident angle of 45 degrees, respectively. This is because, with a scratch, a fold, and the like existing on the surface of a bill, it is inevitable, when light is irradiated only from one side onto unevenness produced in the scratched and folded parts, that a shaded spot as a result of the light being blocked is produced in the part of unevenness. Therefore, in the present embodiment, by irradiating lights from both sides, shading is prevented from being produced in the part of unevenness, whereby making it possible to acquire image data higher in accuracy than that by irradiation from one side.

The control section 6, which is constructed by providing on a substrate a CPU (Central Processing Unit) 60, a ROM (Read Only Memory) 61, and a RAM (Random Access Memory) 62, and a reference data storage section 63, functions as an authentication section of the bill 2.

The ROM 61 stores various programs including an authentication program to be executed by the CPU 60 and permanent data, and the CPU 60 operates in accordance with the programs stored in the ROM 61 to perform a signal input and output with other components described above via an I/O port and thereby performs motion control necessary for authentication in the bill validator 1.

Moreover, the RAM 62 stores data and programs to be used when the CPU 60 operates, and the reference data storage section 63 stores reference data to be used when authentication of a bill is performed, that is, grayscale data acquired from the entire print area of a genuine bill, as reference received light data for each of a transmitted light and a reflected light of infrared light and a transmitted light and a reflected light of red light. Although, in the present embodiment, the reference data is stored in the exclusive reference data storage section 63, this may be stored in the ROM 61.

In the present embodiment, as shown in FIG. 4, stored in a predetermined region of the reference data storage section 63 are four types of reference data storage tables that store reference data (a) according to a transmitted light of infrared light, reference data (b) according to a reflected light of infrared light, reference data (c) according to a transmitted light of red light, and reference data (d) according to a reflected light of red light.

When bills are described in greater detail as Bank of Japan notes, stored in the reference data storage tables are grayscale data by a reflected light and grayscale data by a transmitted light of red light and grayscale data by a reflected light and grayscale data by a transmitted light of infrared light, for each of the seven types of denominations (7 denominations of new one thousand yen, five thousand yen, and ten thousand yen bills and old one thousand yen, two thousand yen, five thousand yen, and ten thousand yen bills), when the bill 2 is placed with its front face up and placed with its back face up, and when the bill 2 is inserted with an orientation of either (provided as rightward in the present embodiment) leftward or rightward in the longitudinal direction, that is, 7×2×1=14 patterns of grayscale data.

Then, at the time of authentication, the inserting direction of the bill 2 is discriminated, and if the inserting direction is leftward, the stored reference data is applied by reversal. As a matter of course, as shown by "leftward" in FIG. 4, reference data when the bill 2 was inserted leftward in the longitudinal direction thereof may be stored in the reference data tables. In this case, 7×2×2=28 patterns of grayscale data are to be stored in the reference data storage tables. Also, the grayscale data may be stored as two-dimensional images.

Furthermore, in the present embodiment, data acquired from a specific region 20, determined in advance in the print area of a surface of the bill 2, different invisibility between under red light being a visible light and under infrared light, is stored in the reference data storage section 63 as specific reference data.

Figure 3A:
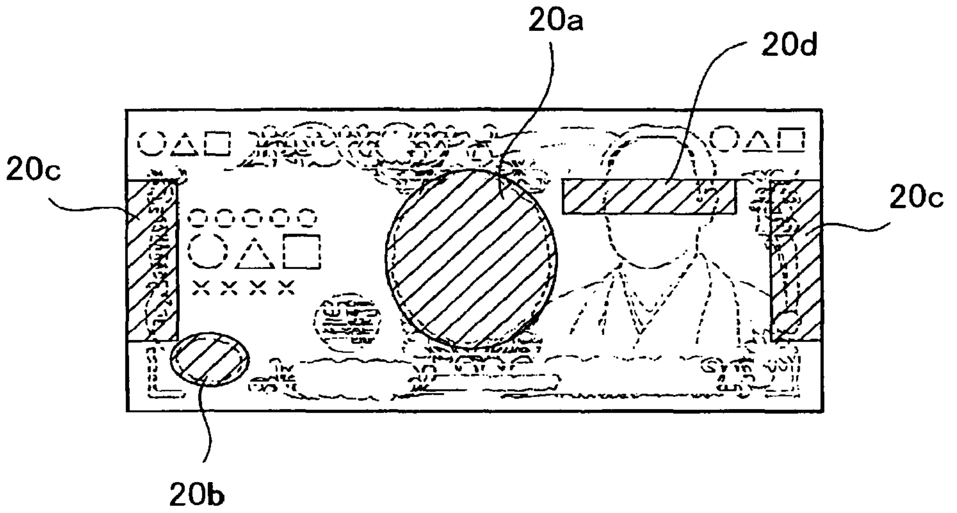
[FIG. 3] Schematic explanatory views showing the front and back faces of a bill.
Figure 3B:
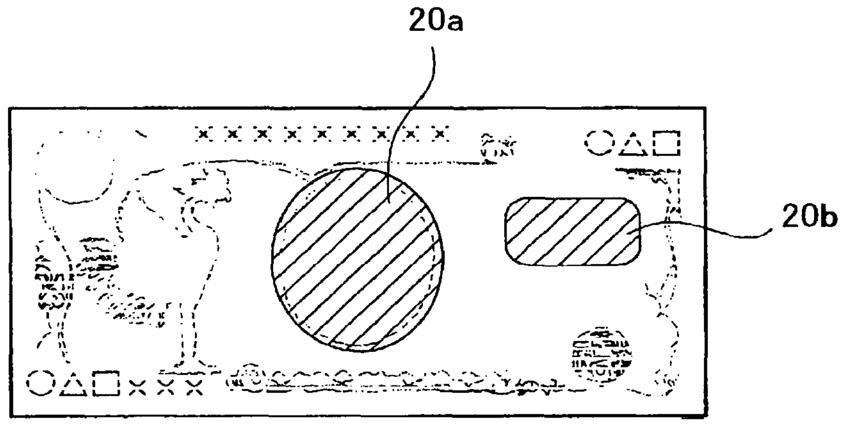

Here, description will be given of the above-mentioned specific region 20. As shown in FIG. 3, a variety of technologies have been applied as anti-counterfeit technologies to a Japanese bill 2, that is, a Bank of Japan note. For example, formed on a front face of the bill 2 is, as shown in FIG. 3A, a watermark region 20*a* where the thickness of fibers has been adjusted, a latent image region 20*b* where a latent image is invisible when being observed straight but appears when being obliquely observed, a special print region 20*c* by a pearl ink where a slightly pinkish pearl luster emerges in a print part when the bill 2 is tilted, and an infrared transmission region 20*d* that transmits infrared light but does not transmit red light and the like. Moreover, as shown in FIG. 3B, the watermark region 20*a* and the latent image region 20*b* are also formed on a back face of the bill 2.

The watermark region 20*a*, the latent image region 20*b*, the special print region 20*c*, and the infrared transmission region 20*d* have been considered as regions difficult to be forged, and are effective for authentication of the bill 2 since, between a genuine bill and a forged bill, a large difference occurs in luminance of a reflected light and a transmitted light of infrared light and red light in the watermark region 20*a*, the latent image region 20*b*, and the special print region 20*c*, and a characteristic that red light is not transmitted is produced in the infrared transmission region 20*d*.

In the present embodiment, these are set as the specific region 20, and the position of each region of the specific region 20 on the bill 2 is defined by coordinates. Particularly, in the latent image region 20*b*, although it has been difficult to recognize a latent image by a transmitted light, since the image can be recognized by infrared light having a wavelength of nearly 950 nm used in the present embodiment, this can be effectively used as a factor of authentication.

Also, since the latent image region 20*b* and the special print region 20*c* do not exist in an old bill, at least, the watermark region 20*a* provided for both new and old bills is used for authentication.

Moreover, in the present embodiment, since it has been discovered that a hidden image can be recognized by transmitting infrared light having a wavelength of nearly 950 nm (near-infrared rays having a wavelength in a range of 920 nm to 980 nm, and preferably, in a range of 940 nm to 960 nm) through the latent image region 20*b* for imaging, with regard to a new bill, the latent image region 20*b* is also used as the specific region 20 for authentication. Accordingly, the infrared light to be irradiated from the first light emitting section 3 and the second light emitting region 5 is provided as one having a wavelength of 950 nm.

Thus, in the reference data storage section 63 of the bill validator 1 of the present embodiment, reference data and specific reference data formed of grayscale data extracted from the reference data with regard to the specific region 20 are stored in advance. Also, with regard to the specific reference data as well, specific reference data according to a transmitted light of infrared light, specific reference data according to a reflected light of infrared light, specific reference data according to a transmitted light of red light, and specific reference data according to a reflected light of red light are formed in tables, respectively, and stored in a predetermined region of the reference data storage section 63.

In the bill validator 1 thus constructed, the present embodiment has a feature in the point of allowing performing authentication with accuracy by, besides comparing a genuine bill and a bill to be authenticated in grayscale data of the bill as a whole, applying weighting to the grayscale data acquired from received light data (transmitted light data and reflected light data) in the specific region 20 described above, and comparing the weighted grayscale data with each other.

More specifically, a weighting to be described later is applied to specific reference data (grayscale data generated from transmitted light data of red light and infrared light transmitted through the specific region 20 and grayscale data generated from reflected light data of red light and infrared light reflected by the specific region 20), respectively, and at the time of authentication of the bill 2, grayscale data in the entire print area acquired from the bill 2 to be authenticated is compared with the reference data, furthermore, grayscale data in the specific region 20 is extracted from the grayscale data of the bill 2 to be authenticated, and a weighting similar to that of the specific reference data is applied thereto, and the specific grayscale data and the specific reference data both weighted are further compared with each other.

That is, in the bill validator 1 according to the present embodiment, when the bill 2 to be authenticated is inserted from a bill conveying slot and conveyed, onto the print area in the surface of the bill 2, infrared light and red light having the same wavelengths as those of lights irradiated onto a genuine bill are irradiated from the first light emitting section 3 and the second light emitting section 5, four types of grayscale data acquired from transmitted light data and reflected light data of infrared light and red light transmitted through the bill 2 are developed in the RAM 62, respectively, and these data and four types (a transmitted light and a reflected light of infrared light and a transmitted light and a reflected light of red light) of reference data stored in the reference data storage section 63 are compared with each other, the same weighting as that of the genuine bill is applied to specific grayscale data acquired from each of the transmitted light data and reflected light data of infrared light and red light in the specific region 20, and the weighted four types of specific grayscale data are developed in the RAM 62, and these data are made to correspond to the four types of specific reference data one to one and compared with each other in order, and it is determined that the bill is a counterfeit bill if any one of the comparison results is a failure.

Hereinafter, description will be given for a case where the bill 2 is practically authenticated by the bill validator 1 according to the present embodiment having the above construction while referring to FIG. 5 to FIG. 8.

Figure 5:
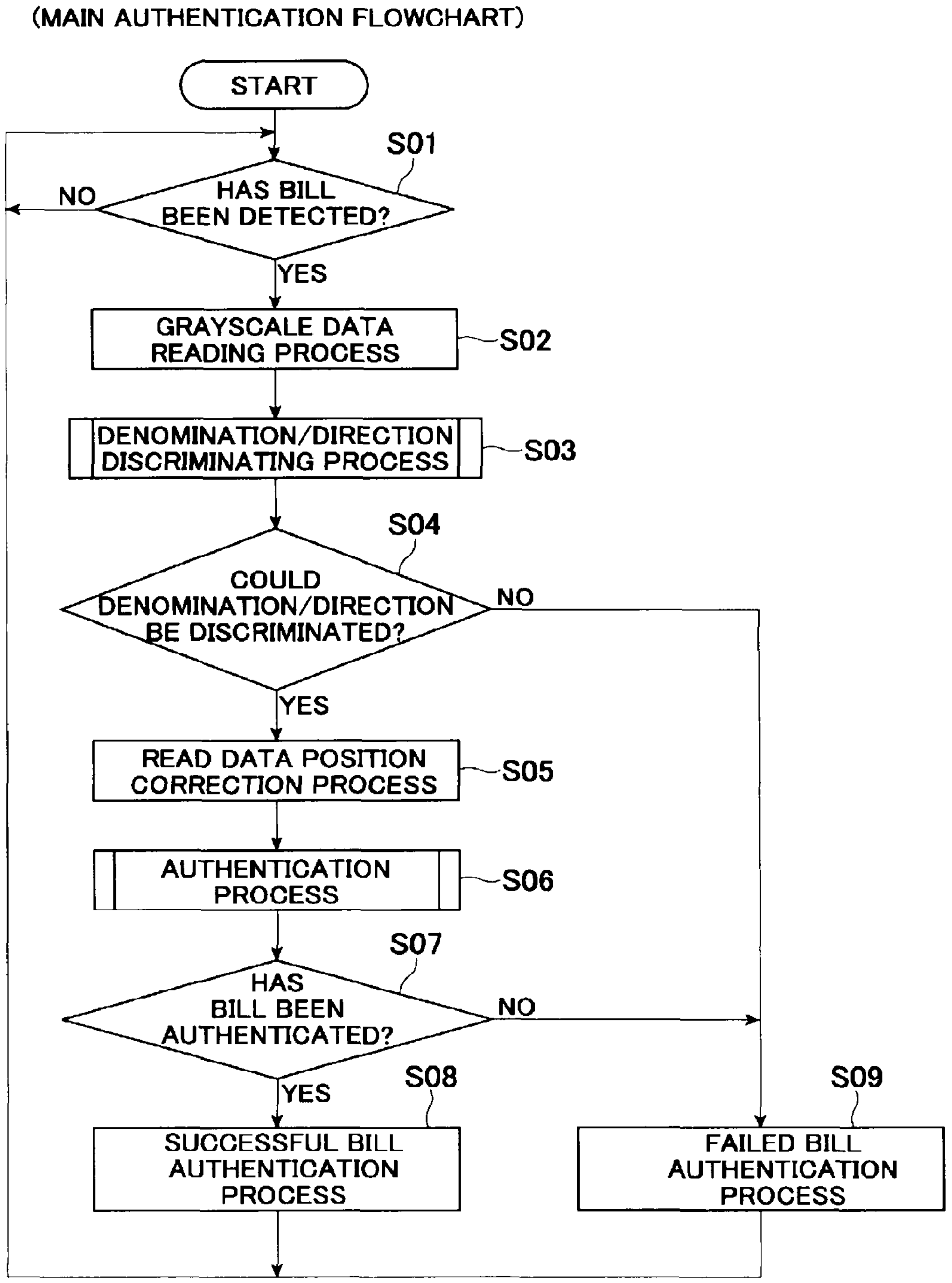
[FIG. 5] A main flowchart of an authentication program.
Figure 6:
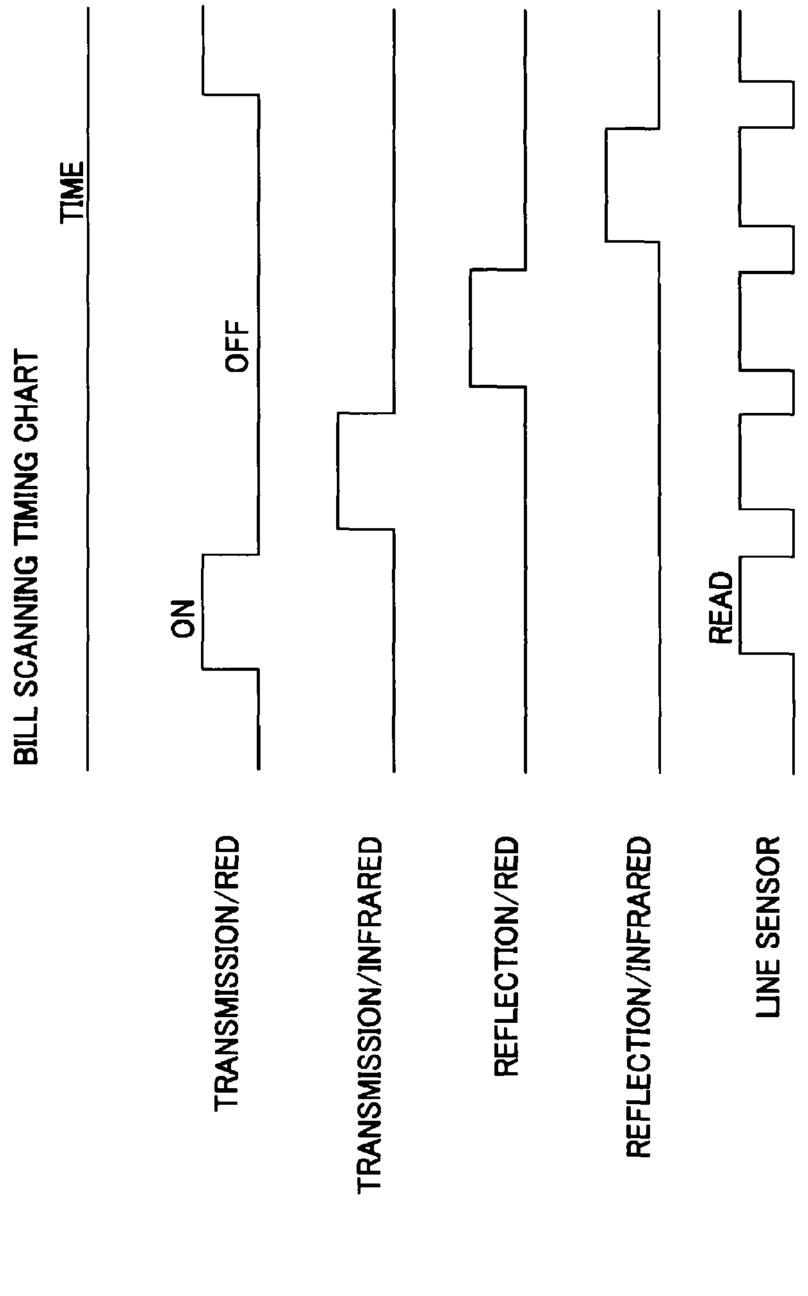
[FIG. 6] A bill scanning timing chart showing timings of irradiating infrared light and red light onto a bill and receiving transmitted light and reflected light.
Figure 7:
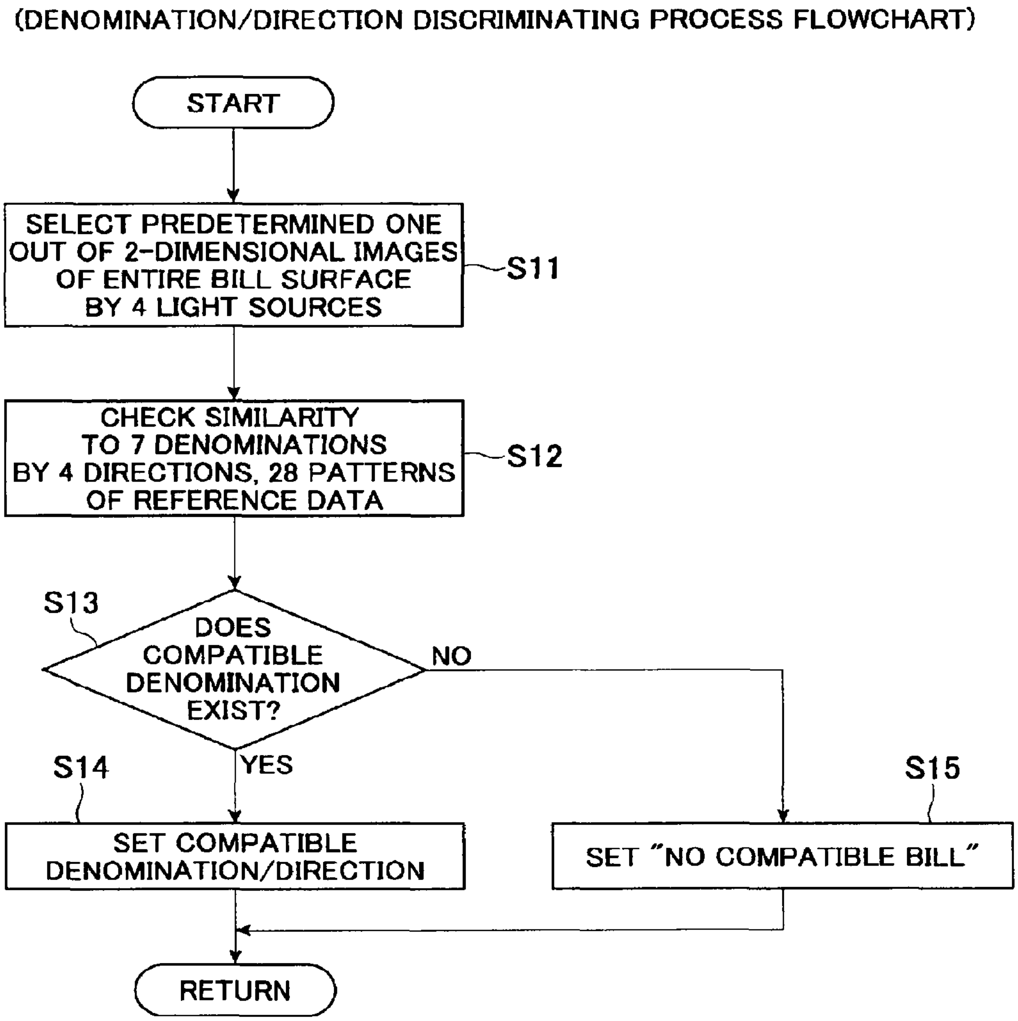
[FIG. 7] A denomination/direction discriminating process flowchart for discriminating the denomination and the conveying direction of a bill.
Figure 8:
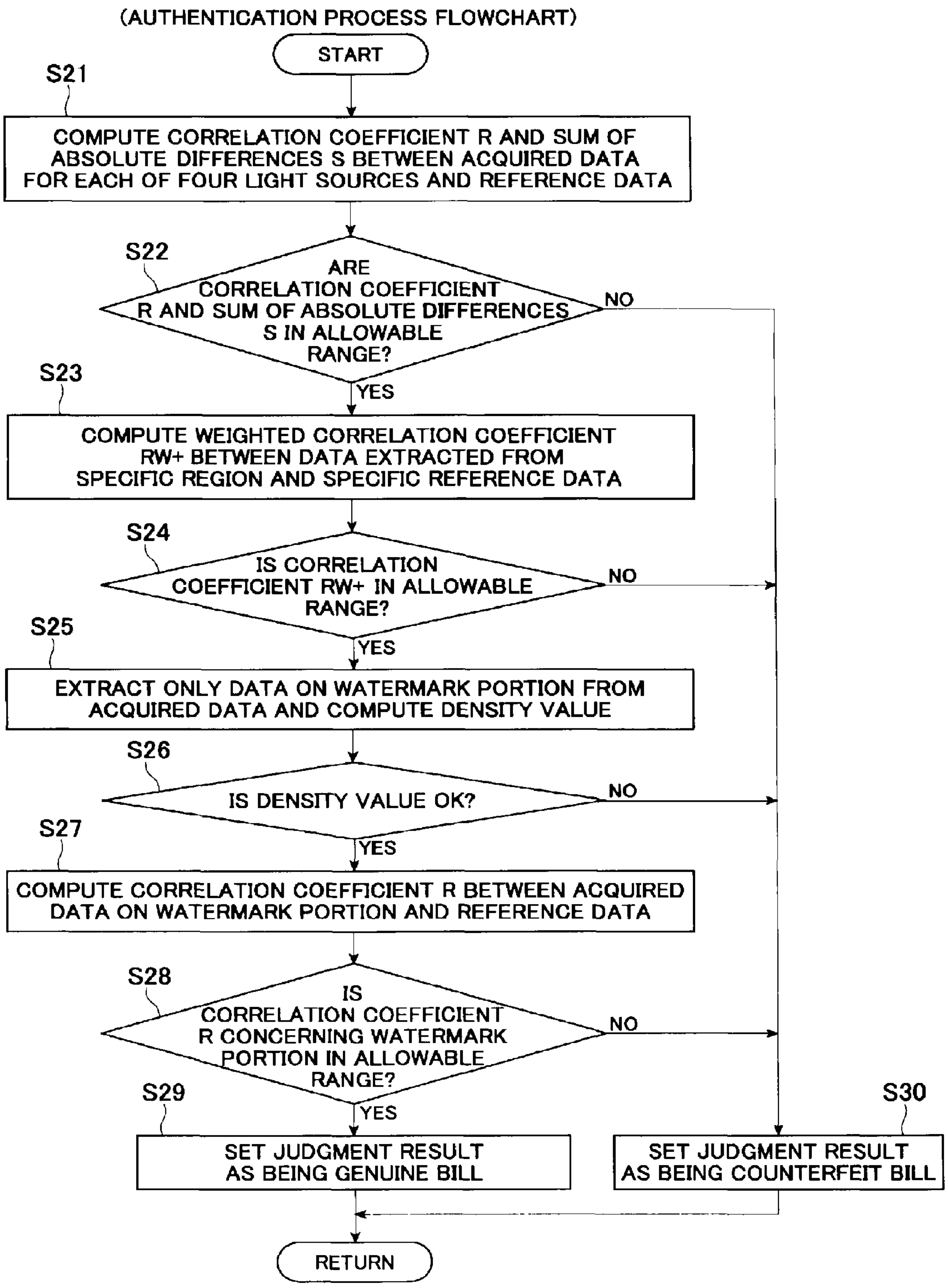
[FIG. 8] A flowchart showing an authentication process.

FIG. 5 is a main flowchart of an authentication program, FIG. 6 is a bill scanning timing chart showing timings of irradiating infrared light and red light onto the bill 2 and receiving transmitted light and reflected light, FIG. 7 is a denomination/direction discriminating process flowchart for discriminating the denomination and the conveying direction of a bill, and FIG. 8 is an authentication process flowchart.

The process in each flowchart is executed by the authentication program stored in the ROM 61.

The authentication program is a program to make the control section 6 execute a step of irradiating, onto a print area of the surface of a bill 2 to be authenticated, infrared light having the predetermined wavelength from the first light emitting section 3 and the second light emitting section 5 being light emitting unit, a first comparing step of comparing transmitted light data of infrared light transmitted through the bill with reference data stored in advance, a step of applying a predetermined weighting to transmitted light data of infrared light in the respective specific regions 20 of the bill 2 to be authenticated and the genuine bill, a second comparing step of comparing the weighted data with each other, and a step of authenticating the bill based on comparison results in the first and second comparing steps.

As shown in FIG. 5, the CPU 60 of the control section 6 of the bill validator 1 determines whether the bill sensor 12 (see FIG. 1 and FIG. 2) has detected a bill 2 (step S01).

If the bill sensor 12 has detected a bill 2, it is judged that the bill 2 has been inserted in the bill insertion slot (Yes in step S01), the CPU 60 outputs a conveying signal to the motor drive circuit 11*d* to drive the drive motor 11*c* and rotate the conveying rollers 11, so as to convey the inserted bill 2 at a predetermined speed. Here, in the present embodiment, the bill 2 is conveyed in the direction of a longer side thereof, as shown in FIG. 1.

Next, the CPU 60 of the control section 6 outputs an irradiating signal to the first and second light emitting sections 3 and 5 to output red light being visible light rays and infrared light from the respective light emitting sections 3 and 5 and irradiate the same toward the bill 2, executes a reading process of grayscale data of the print area as a whole on the surface of the bill 2, and produces a two-dimensional image (step S02).

At this time, since the first and second light emitting sections 3 and 5 have been arranged in a line form extending in a crossing direction with respect to the bill conveying path 10, lights to be outputted from the first and second light emitting sections 3 and 5 are irradiated across the width of the bill 2. And, the irradiated red light and infrared light are transmitted through or reflected from the entire surface of the bill 2, and a transmitted light and a reflected light thereof enter the light receiving sensor of the light receiving section 4. As in the foregoing, since the light receiving sensor has also been provided as a line sensor, this allows detecting a reflected light and a transmitted light of the respective rays of light by its entire length to read grayscale data.

Moreover, in the grayscale data reading process of the present embodiment, as shown in FIG. 6, respective red lights and respective infrared lights of the first light emitting section 3 and the second light emitting section 5, that is, four light sources consisting of light sources for transmission of red light and infrared light and light sources for reflection of red light and infrared light repeat lighting up and off at constant intervals, and moreover, the light sources never become in phase with each other, so that two or more light sources do not simultaneously light up. In other words, when one light source is lit, three other light sources are unlit.

Accordingly, even the single light receiving section 4 can detect lights of the respective light sources at constant intervals to read an image formed of grayscale data of the print area of the bill 2 by a transmitted light and a reflected light of red light and a transmitted light and a reflected light of red light.

Next, the CPU 60 of the control section 6 performs a denomination/direction discriminating process to discriminate the denomination (for example, 7 denominations of new one thousand yen, five thousand yen, and ten thousand yen bills and old one thousand yen, two thousand yen, five thousand yen, and ten thousand yen bills) and the inserting direction (4 directions distinguished by whether the front face of the bill 2 was up or down and the orientation with which the bill 2 was inserted at that time) of the inserted bill 2 (step S03). Also, the denomination/direction discriminating process will be described later in detail.

Next, the CPU 60 of the control section 6 judges whether the denomination and conveying direction could be discriminated (step S04), and if, for example, the bill has been significantly stained or damaged and the denomination and conveying direction could not be discriminated (No in step S04), the CPU 60 shifts the process to step S09 to perform a failed bill discrimination process. In the failed bill discrimination process, the CPU 60 outputs a signal to reversely rotate the drive motor 11*c* to the motor drive circuit 11*d* to thereby reversely rotate the conveying rollers 11 and forcedly return the bill 2 to the bill insertion slot, and shifts the process to step S01.

On the other hand, if the denomination and direction could be discriminated (Yes in step S03), the CPU 60 moves the acquired two-dimensional image within a constant range to perform a position correction so that a correlation coefficient with reference data is maximized (step S05).

Then, the CPU 60 performs authentication of the bill in step S06. Although the authentication will be described later in detail, when this is briefly described, first, a correlation coefficient and an absolute differences value between the acquired data and reference data are computed for each of the four light sources (infrared transmission, infrared reflection, red transmission, and red reflection). Next, data on a specific region is extracted and a weighting is applied thereto, and weighted correlation coefficients are computed for the four light sources. Furthermore, of transmitted light data, data on only the watermark region 20*a* is extracted, a differential coefficient is determined inside, and the size thereof is computed. Lastly, a correlation coefficient with specific reference data in the watermark region 20*a* is computed. Then, it is determined to be a genuine bill if all of the computed correlation coefficients are within a determined range or to be a counterfeit bill if any one thereof is out of the range.

Also, at this time, by using a large number of genuine bills as samples to determine, in advance, an average, variance, and covariance of the respective numerical values, validation using a Mahalanobis distance can also be considered. This is for comprehensively judging computed numerical values by using a multivariate analysis, not for considering the same individually.

If it is determined to be a genuine bill as a result of authentication (Yes in step S07), the CPU 60 shifts the process to step S08, executes a successful bill validation process to handle the bill 2 as a genuine bill, and executes a process of, for example, a money exchange, or prepaid card vending.

On the other hand, if it is determined that the bill 2 is a counterfeit bill (No in step S07), the CPU 60 executes a failed bill recognition process (step S09). Also, in this case of a failed bill recognition process, it is desirable to perform a process different from that when being shifted from step S04 earlier, so as to, for example, keep the inserted bill 2 housed without returning and execute, if in a game arcade, notification to a game arcade manager or a report or the like to the law enforcement authorities.

Here, the denomination/direction discriminating process of step S03 will be described in detail. Also, the reference data storage section 63 of the control section 6 has stored reference data of seven denominations and in the rightward direction for each of the four types of light (a transmitted light and a reflected light of infrared light and a transmitted light and a reflected light or red light), which is as in the foregoing.

As shown in FIG. 7, the CPU 60 of the control section 6, first, selects, from two-dimensional images produced from grayscale data acquired from the entire surface of the bill 2 to be authenticated being conveyed, that is, the entire print area, for example, one according to transmitted light data of infrared light (step S11).

Next, similarity between the seven denominations by four directions, 28 patterns (data in the rightward direction is reversed when the bill 2 is inserted in the leftward direction) of acquired data and reference data is checked (step S12). Concretely, a correlation coefficient R expressed by the following formula is used as an index to indicate similarity.

[Mathematical Formula 1]

$$R = \frac{\sum_i \sum_j (f[i,j] - F)(s[i,j] - S)}{\sqrt{\sum_i \sum_j (f[i,j] - F)^2}\sqrt{\sum_i \sum_j (s[i,j] - S)^2}}$$

In the formula, [i,j] represent coordinates of a bill, and a density value (luminance value) of a two-dimensional image of data acquired from the bill 2 to be authenticated at the bill coordinates [i,j] is denoted by f[i,j], a density value of reference data is denoted by s[i,j], an average density of the acquired data is denoted by F, and an average density of the reference data is denoted by S.

The correlation coefficient R takes a value of −1 to +1, and it is determined that the closer to +1, the higher the similarity is. Then, all correlation coefficients with reference data of the seven denominations in the respective four directions are computed, and a denomination and direction that has indicated the highest value is determined as the denomination/direction of the inserted bill 2 to be authenticated.

Also, in the present embodiment, the above-described method is adopted since grayscale data in the entire print area of the surface of the bill is stored in advance as reference data, however, even not by such a method, as long as the denomination/direction is discriminated, validation is not necessary in the entire print area. For example, correlation coefficients with reference data may be computed for three lines (center of the bill 2, about 9 mm from the upper side, and about 9 mm from the lower side) in three longer-side directions of acquired data, so that one with the highest average of the three lines is determined as the denomination/direction of the bill 2 to be authenticated. In this case, since the determination is simplified, the determination time can also be reduced.

Next, the CPU 60 performs a determination in the process of step S12 (step S13), and if a compatible denomination exists as a result of determination, the CPU 60 sets, for a subsequent authentication process, an identification code to decide on the compatible denomination and direction (step S14), and shifts the process to step S04. On the other hand, when the CPU 60 has determined that there is no compatible denomination as a result of determination, the CPU 60 sets an identification code indicating that no compatible bill exists (step S15), and shifts the process to step S04.

Next, the authentication process in step S06 of FIG. 5 will be described in detail.

As shown in FIG. 8, the CPU 60 computes similarity in the entire print area of the surface of the bill between grayscale data acquired from the bill 2 to be authenticated and reference data stored in advance, for each of the four types of light (transmitted light of infrared light, reflected light of infrared right, transmitted light or red light, and reflected light of red light) (step S21). At this time, the correlation coefficient R and a sum of absolute differences SUM expressed by the following formula are used.

$$\mathrm{SUM} = \sum_i \sum_j |f[i, j] - s[i, j]| \qquad \text{[Mathematical Formula 2]}$$

In the formula, [i,j] represent coordinates of a bill, and a density value (luminance value) of a two-dimensional image of data acquired from the bill 2 to be authenticated at the bill coordinates [i,j] is denoted by f[i,j], and a density value of reference data is denoted by s[i,j].

Next, it is determined whether the correlation coefficient R and the sum of absolute differences SUM are in an allowable range (step S22). At this time, the closer the value of the correlation coefficient R to +1, and the closer the sum of absolute differences SUM to 0, the closer to the reference data. Then, if out of the allowable range (No in step S22), the CPU 60 determines that the bill is a counterfeit bill, sets a code as being a counterfeit bill (step S30), and shifts the process to step S07. On the other hand, if the value of the correlation coefficient R is in the allowable range in step S24 (Yes in step S22), the CPU 60 shifts the process to step S23.

In step S23, the CPU 60 computes a correlation coefficient RW+ with a large weighting applied between the data extracted from the specific region 20 and the specific reference data. Also, the specific region 20 set here is the latent image region 20*b*, the special print region 20*c*, and the like, which are regions that are different in grayscale between red light and infrared light, and there is a negative correlation between red light and infrared light. Moreover, in the present embodiment, a weighting map computed in advance is prepared to compute the correlation coefficient RW+ shown in the following.

$$R_{wt} = \frac{\sum_i \sum_j w[i, j](f[i, j] - F)(s[i, j] - S)}{\sqrt{\sum_i \sum_j w[i, j](f[i, j] - F)^2}\sqrt{\sum_i \sum_j w[i, j](s[i, j] - S)^2}} \qquad \text{[Mathematical Formula 3]}$$

At this time, a weighting map for transmitted light is used for transmitted lights of red light and infrared light, and for reflected lights thereof, a weighting map for reflected light, to compute weighted correlation coefficients.

Moreover, weightings w[i,j] at each of the coordinates to define the specific region 20 can be determined from specific reference data of red light and infrared light by a formula expressed in the following, and for determination of the weightings w[i,j], a calculation may be performed every time authentication is performed.

With coordinates of $(s_r[i,j]-S_r)(s_{ir}[i,j]-S_{ir})<0, w[i,j]=1+c\times|(s_r[i,j]-S_r)(s_{ir}[i,j]-S_{ir})|$ With coordinates of $(s_r[i,j]-S_r)(s_{ir}[i,j]-S_{ir})\geqq 0, w[i,j]=1$ [Mathematical Formula 4]

In the formula, [i,j] represent coordinates of a bill, and a density value (luminance value) of specific reference data of red light of the bill 2 to be authenticated at the bill coordinates [i,j] is denoted by sf[i,j], a density value of specific reference data of infrared light is denoted by Sir[i,j], an average density of the specific reference data of red light is denoted by Sr, and an average density of the specific reference data of infrared light is denoted by Sir. Moreover, c represents a weighting ratio coefficient, which is a value appropriately determined.

Then, it is determined whether the correlation coefficient RW+ is in an allowable range (step S24). Since the weighted correlation coefficient RW+ also takes a value of −1 to +1, it is determined that the closer to +1, the closer to the specific reference data. Then, if out of the allowable range (No in step S24), the CPU 60 determines that the bill is a counterfeit bill as a result of determination, sets a code as being a counterfeit bill (step S30), and shifts the process to step S07. On the other hand, if it is determined in step S24 to be in the allowable range (Yes in step S24), the CPU 60 shifts the process to step S25.

In step S25, the CPU 60 extracts data on the watermark region 20*a* from data acquired from the bill 2 to be authenticated, and computes a density value thereof. More specifically, a mask set in white for the watermark region 20*a* and in black for a region other than the same is prepared in advance for each of the denominations, and an acquired two-dimensional image is multiplied by the mask, whereby only data on the watermark region 20*a* can be extracted.

Then, in order to check whether any image exists inside the watermark region 20*a*, the size of a gradient g[i,j] expressed by the following formula is computed, and a total of gradients across the watermark region 20*a* as a whole is computed.

$$g[i,j]=\sqrt{(f[i+1,j]-f[i-1,j])^2+(f[i,j+1]-f[i,j-1])^2} \qquad \text{[Mathematical Formula 5]}$$

Also, a density value of an acquired two-dimensional image at coordinates [i,j] is denoted by f[i,j]. For example, a counterfeit bill forged by a copier or the like may not have a watermark portion (including one where the density in the watermark region 20*a* is relatively flat), and in that case, the density value is low.

Then, the CPU 60 determines whether the density of the watermark region 20*a* is in an allowable range (step S26), and if out of the allowable range (No in step S26), the CPU 60 determines that the bill is a counterfeit bill, sets a code as being a counterfeit bill as a result of determination (step S30), and shifts the process to step S07. On the other hand, if it is determined in step S26 to be in the allowable range (Yes in step S26), the CPU 60 shifts the process to step S25.

Subsequently, the CPU 60 computes a correlation coefficient R to check similarity between the acquired two-dimensional image of the watermark region 20*a* and a two-dimensional image produced from the reference data (step S27).

Subsequently, the CPU 60 determines whether the correlation coefficient R is in an allowable range (step S28), and if out of the allowable range (No in step S28), the CPU 60 determines that the bill is a counterfeit bill, sets a code as being a counterfeit bill as a result of determination (step S30), and shifts the process to step S07. On the other hand, if it is determined in step S28 to be in the allowable range (Yes in step S28), the CPU 60 shifts the process to step S29, sets a code as being a genuine bill as a result of determination (step S29), and shifts the process to step S07.

Meanwhile, in the foregoing, for the determination with regard to the watermark region 20*a*, it is desirable to carry out, as a pre-process, a brightness correction and a position correction to be mentioned in the following.

The watermark region 20*a* often has a fold in the lengthwise or transverse direction, and unevenness in brightness can also be produced in the lengthwise direction, and thus a brightness correction is carried out for both of the acquired two-dimensional image and reference image stored in advance so that, in a small rectangular region including the watermark region 20*a*, lengthwise and transverse grayscale cumulative distributions are equalized. Also, for a comparison in the entire print area of the bill 2, a fold and unevenness may be ignored since the influence thereof is not so great.

Moreover, there is an individual difference from one bill to another in the position of an image (for example, a figure) in the watermark region 20*a*, and in order to compensate for this, a position correction is performed in a predetermined range by 8-neighborhood search, and a point where the correlation coefficient is maximized is determined.

As above, in the present embodiment, there are a plurality of determining steps using computed numerical values, and moreover, while a determination with weighting applied to data on the specific region 20 is simultaneously used, a bill is determined as a genuine bill only when all numerical values fall in the allowable range, and determined as a counterfeit bill if any one numerical value out of the range has been computed. Accordingly, an extremely high authentication accuracy is provided, which makes it possible to cope with sophisticated forgery techniques, and even without being overwhelmed by developments against wave after wave of new forgery techniques, a method for authenticating a bill and an apparatus for authenticating a bill also excellent in cost performance can be provided.

Moreover, since the present authentication method and apparatus can also be applied to bill validators installed in places, such as game arcades and the like in the present embodiment, that are likely to be targets of counterfeit bill crimes, the bill validators can be replaced by ones having a sufficient authentication accuracy even at a low cost, so that counterfeit bill crimes can be prevented.

Although, in the present embodiment, a description has been given assuming that, for a comparison between a bill to be authenticated and a genuine note, four types of light sources of a transmitted light and a reflected light of infrared light and a transmitted light and a reflected light of red light are used, at least transmitted light data of infrared light may be used. At this time, the wavelength is desirably 950 nm as in the embodiment described above, or a value 950 nm.

Moreover, although, in the embodiment described above, a description has been given assuming that, for authentication, a determination is made by correlation coefficients, a determination can also be made by, for example, producing analog waveforms from received light data and comparing the waveforms with each other. Then, in the case of a comparison with weighting applied, the waveform can also be enlarged so as to enhance authentication accuracy.

Moreover, although, in the embodiment as has been described above, a description has been given in a manner divided into a first comparing step of comparing transmitted light data of infrared light transmitted through the entire print area of the surface of a bill to be authenticated with the reference data and a second comparing step of applying a predetermined weighting to the transmitted light data of infrared light in a specific region specified in advance in a print area of the surface of a bill and comparing the weighted data between the bill to be authenticated and the genuine bill, the comparisons can also be simultaneously performed without being divided.

More specifically, by use of an authentication program incorporated in advance with a correlation equation for comparison including a relational expression for applying weighting, in transmitted light data of infrared light transmitted through the entire print area of the surface of a genuine bill and reflected light data of red light reflected from the same, data on a specific region applied in advance with weighting is stored in a storage device as reference data, while in an authentication apparatus integrated with the authentication program, out of transmitted light data of infrared light transmitted through the entire print area of the surface of a bill to be authenticated or reflected light data of red light reflected from the same, data on the specific region part is applied with weighting in parallel, and the data is compared with the reference data.

Moreover, as the method for applying a predetermined weighting to transmitted light data and reflected light data acquired from the specific region 20 more than data acquired in the entire print area, a method for increasing the amount of transmitted light data and/or reflected light data in the specific region 20 larger than that of the other regions may be adopted.

For example, when LED arrays or the like of a large number of LEDs provided in lines are used, the LEDs are driven in a thinned-out manner for an irradiation to a region other than the specific region 20 specified by coordinates, while all LEDs are driven for the specific region 20.

Alternately, with regard to the specific region 20 that is specified by coordinates, the conveying speed of a bill by the bill conveying mechanism may be controlled to become lower than that in other regions, so as to increase the amount of transmitted light data and reflected light data. More specifically, the coordinate density is increased to increase the data amount.

Moreover, in the case of the bill validator 1 of the present embodiment, although it is possible to control the conveying speed as in the foregoing, it is still possible to cope therewith by changing the light emission interval, that is, the scanning timing.

Meanwhile, in the present embodiment, authentication is performed following the flow of step S21 to step S28, however, authentication may be performed by using the special region 20, that is, by only step S23 and step S24, and it is also possible to appropriately perform authentication by, for example, appropriately combining other steps.

The embodiment as has been described above allows realizing the following method and apparatus for authenticating a bill.

A method for authenticating a bill, including: a first comparing step of irradiating light having a predetermined wavelength (for example, infrared light) onto a print area of a surface of a genuine bill from a light emitting unit, storing in advance transmitted light data of light transmitted through the genuine bill (for example, a two-dimensional image and a waveform produced from grayscale data) as reference data, irradiating light having the predetermined wavelength (for example, infrared light) onto a print area of a surface of a bill to be authenticated from a light emitting unit (for example, a first light emitting section 3, a second emitting section 5), and comparing transmitted light data of light transmitted through the bill with the reference data; and a second comparing step of determining in advance a specific region (for example, determining, in advance, a region different in an image to be acquired between under visible light such as red light and under infrared light as a specific region) in a print area of a surface of a bill, applying a predetermined weighting to the transmitted light data of light in the specific regions 20 (for example, a watermark region 20*a*, a latent image region 20*b*, a special print region 20*c*, an infrared transmission region 20*d*, and the like) of the bill to be authenticated and the genuine bill, and comparing the weighted data with each other, wherein based on comparison results in the first and second comparing steps, the bill is authenticated.

A method for authenticating a bill that determines authenticity by irradiating, onto a print area of a genuine bill for which, in a print area of a surface of a bill, a region different in an image to be acquired between under visible light and under infrared light is determined in advance as a specific region 20 (for example, a watermark region 20*a*, a latent image region 20*b*, a special print region 20*c*, an infrared transmission region 20*d*), infrared light having a specific wavelength from a light emitting unit, storing, in advance, as reference data, data prepared by applying a predetermined weighting to, of transmitted light data (for example, a two-dimensional image and a waveform produced from grayscale data) of infrared light transmitted through the genuine bill, transmitted light data transmitted through the specific region, as well as irradiating, onto a print area of a surface of a bill to be authenticated, infrared light having the predetermined wavelength from a light emitting unit (for example, a first light emitting section 3, a second light emitting section 5), applying the same weighting as that of the genuine bill to, of transmitted light data of infrared light transmitted through the bill, transmitted light data transmitted through the specific region, and comparing entire transmitted light data including the weighted transmitted light data in the specific region with the reference data.

A method for authenticating a bill, for which in the methods for authenticating a bill, when comparing a bill to be authenticated and a genuine bill, besides the transmitted light data of light, reflected light data of light in the specific regions 20 are further used.

A method for authenticating a bill, for which in the methods for authenticating a bill, the light emitting unit (for example, a first light emitting section 3, a second emitting section 5) is capable of irradiating light of different wavelengths (for example, red light and infrared light), and when comparing a bill to be authenticated and a genuine bill, transmitted light data and/or reflected light data of light having a different wavelength in the specific regions 20 are further used.

A method for authenticating a bill, for which in the methods for authenticating a bill, the specific region 20 includes a region (for example, a watermark region 20*a*, a latent image region 20*b*, a special print region 20*c*, an infrared transmission region 20*d*) where data to be acquired when lights having a different wavelength is irradiated is different.

A method for authenticating a bill, for which in the methods for authenticating a bill, as the predetermined weighting, transmitted light data and/or reflected light data in the specific region is multiplied by a weighting ratio.

A method for authenticating a bill, for which in the methods for authenticating a bill, as the predetermined weighting, the amount of transmitted light data and/or reflected light data in the specific region is increased to be larger than that of data in other regions.

An apparatus for authenticating a bill including: a bill conveying mechanism (for example, composed of a conveying roller 11, a drive motor 11*c*, and a motor drive circuit 11*d*) that conveys a bill to be authenticated; an optical sensor (for example, composed of a first light emitting section 3, a second light emitting section 5, and a light receiving section 4) that irradiates light onto a bill conveyed by the bill conveying mechanism and receives a transmitted light irradiated and transmitted through the bill and a reflected light reflected from the bill; a weighting unit (for example, a control section 6) that applies weighting to received light data detected by the optical sensor in a specific region (for example, a watermark region 20*a*, a latent image region 20*b*, a special print region 20*c*, an infrared transmission region 20*d*) determined in a print area of a surface of the bill; and an authenticating section (for example, a CPU 60 of the control section 6) that determines authenticity of the bill 2, wherein the authenticating section includes: a storing unit (for example, a reference data storage section 63 and a ROM 61) that stores reference received light data in an entire print area of a surface of a genuine bill including the specific region; a first comparing unit (for example, the control section 6) that compares the reference received light data in the entire print area stored in the storing unit with received light data in an entire print area of a surface of a bill to be authenticated acquired by the optical sensor; and a second comparing unit (for example, the control section 6) that compares weighted received light data in the respective specific regions of the bill to be authenticated and the genuine bill with each other.

Although, in the embodiment described above, a description has been given of a mode for carrying out the present invention taking the bill validator 1 for authenticating the bill 2 as an example, the present invention can also be applied to a method and apparatus for authenticating foreign currency such as US dollar bills, besides the bill 2 as being a Bank of Japan note, and so-called cash vouchers, and other securities.

What is claimed is:

1. A method for authenticating a bill, comprising:

a first comparing step of irradiating light having a predetermined wavelength onto a print area of a surface of a genuine bill from a light emitting unit, storing in advance transmitted light data of light transmitted through the genuine bill as reference data, irradiating light having the predetermined wavelength onto a print area of a surface of a bill to be authenticated from a light emitting unit, and comparing transmitted light data of light transmitted through the bill with the reference data; and a second comparing step of determining in advance at least two specific regions in a print area of a surface of a bill, wherein the at least two specific regions have different invisibility under different lights of different wavelengths, applying a predetermined weighting to the transmitted light data of light in the at least two specific regions of the bill to be authenticated and the genuine bill, and comparing the weighted data with each other, wherein based on comparison results in the first and second comparing steps, the bill is authenticated, wherein the at least two specific regions include a watermark region and at least one region selected from the group consisting of a latent image region, a special print region, and a predetermined light transmission region.

2. The method for authenticating a bill according to claim 1, wherein when comparing a bill to be authenticated and a genuine bill, besides the transmitted light data of light, reflected light data of light in the at least two specific regions are further used.

3. The method for authenticating a bill according to claim 1, wherein the light emitting unit is capable of irradiating light of different wavelengths, and when comparing a bill to be authenticated and a genuine bill, transmitted light data and/or reflected light data of lights having different wavelengths in the at least two specific regions are further used.

4. The method for authenticating a bill according to claim 1, wherein the at least two specific regions include a region that is different in data to be acquired when lights of different wavelengths are irradiated.

5. The method for authenticating a bill according to claim 2, wherein, as the predetermined weighting, transmitted light data and/or reflected light data in the at least two specific regions are multiplied by a weighting ratio.

6. The method for authenticating a bill according to claim 2, wherein, as the predetermined weighting, the amount of transmitted light data and/or reflected light data in the at least two specific regions are increased to be larger than that of data in other regions.

7. An apparatus for authenticating a bill comprising:

a bill conveying mechanism that conveys a bill to be authenticated;

an optical sensor that irradiates light onto a bill conveyed by the bill conveying mechanism and receives a transmitted light irradiated and transmitted through the bill;

a weighting unit that applies weighting to received light data acquired by being received by the optical sensor in at least two specific regions determined in a print area of a surface of the bill, wherein the at least two specific regions have different invisibility under different lights of different wavelengths; and an authenticating section that determines authenticity of a bill, wherein the authenticating section includes:

a storing unit that stores reference received light data in an entire print area of a surface of a genuine bill including the at least two specific regions;

a first comparing unit that compares the reference received light data stored in the storing unit with received light data in an entire print area of a surface of a bill to be authenticated acquired by the optical sensor; and a second comparing unit that compares weighted received light data in the respective at least two specific regions of the bill to be authenticated and the genuine bill with each other, wherein the at least two specific regions include a watermark region and at least one region selected from the group consisting of a latent image region, a special print region, and a predetermined light transmission region.

8. A method for authenticating a bill, comprising:

a first comparing step of irradiating light having a predetermined wavelength onto a print area of a surface of a genuine bill from a light emitting unit, storing in advance transmitted light data of light transmitted through the genuine bill as reference data, irradiating light having the predetermined wavelength onto a print area of a surface of a bill to be authenticated from a light emitting unit, and comparing transmitted light data of light transmitted through the bill with the reference data; and a second comparing step of determining in advance at least two specific regions including a watermark region in a print area of a surface of a bill, wherein the at least two specific region have different invisibility under different lights of different wavelengths, applying a predetermined weighting to the transmitted light data of light in the at least two specific regions of the bill to be authenticated and the genuine bill, and comparing the weighted data with each other, wherein based on comparison results in the first and second comparing steps, the bill is authenticated, wherein a brightness correction and a position correction are carried out as a pre-process to determine the watermark region.

9. An apparatus for authenticating a bill comprising:

a bill conveying mechanism that conveys a bill to be authenticated;

an optical sensor that irradiates light onto a bill conveyed by the bill conveying mechanism and receives a transmitted light irradiated and transmitted through the bill;

a weighting unit that applies weighting to received light data acquired by being received by the optical sensor in at least two specific regions including a watermark region determined in a print area of a surface of the bill, wherein the at least two specific regions have different invisibility under different lights of different wavelengths; and an authenticating section that determines authenticity of a bill, wherein the authenticating section includes:

a storing unit that stores reference received light data in an entire print area of a surface of a genuine bill including the at least two specific regions;

a first comparing unit that compares the reference received light data stored in the storing unit with received light data in an entire print area of a surface of a bill to be authenticated acquired by the optical sensor; and a second comparing unit that compares weighted received light data in the respective at least two specific regions of the bill to be authenticated and the genuine bill with each other, wherein a brightness correction and a position correction are carried out as a pre-process to determine the watermark region.

* * * * *